R. W. HARDIE.
METHOD OF MAKING BILGE BODIES.
APPLICATION FILED AUG. 19, 1910.
992,421.
Patented May 16, 1911
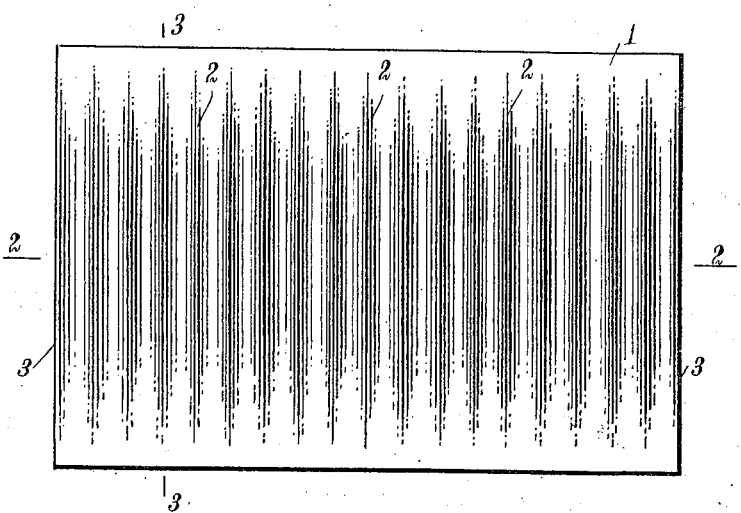
Fig.1
Fig.2
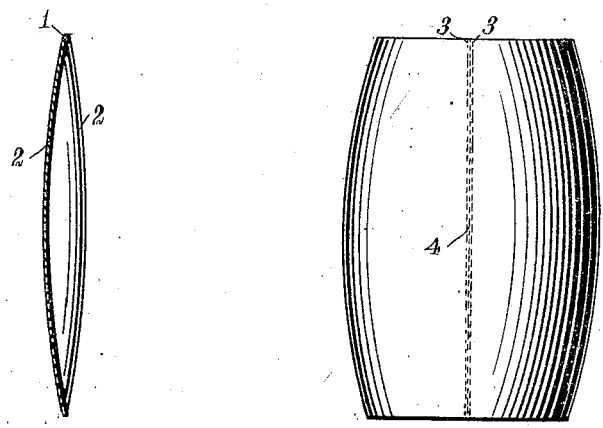
Fig.3
Fig.4
WITNESSES
INVENTOR

UNITED STATES PATENT OFFICE.

ROBERT W. HARDIE, OF NEW YORK, N. Y.

METHOD OF MAKING BILGE BODIES.

992,421. Specification of Letters Patent. Patented May 16, 1911.

Original application filed January 24, 1908, Serial No. 412,390. Divided and this application filed August 19, 1910. Serial No. 578,037.

*To all whom it may concern:*

Be it known that I, ROBERT W. HARDIE, a citizen of the United States, and a resident of the city of New York, borough of Manhattan, in the county and State of New York, have invented new and useful Improvements in the Method of Making Bilge Bodies, of which the following is a full, clear, and exact description.

This is a division of an application filed by me January 24, 1908, Serial No. 412,390, on which Letters Patent were issued to me October 27, 1908, No. 901,963.

In receptacles heretofore used, made of sheet metal and having a bilge-shaped body, it has been necessary to join together the ends of the sheet forming the body, by means of an overlapping joint. This requires the ends of the sheet to be perforated and then riveted together, and the joint when finished must be sealed by brazing when the receptacle is to be used for oils, chemicals or similar liquids.

In order to avoid the expense of perforating, riveting and brazing the seam of a barrel, and in order to avoid the protruding edge of the overlapping sheet and produce a smooth surface at the joint, I have provided for welding the edges of a sheet or sheets together by means of a butt weld so as to make a smooth surface.

In the bilge shaped receptacles heretofore made, it has been impossible to secure the edges of the sheets together by a butt welded seam, because in the only practical method known to me and heretofore followed the body has been stretched into a bilge-shaped form after it has been first formed in drum shape, and the edges of the sheets riveted together. If the edges of the sheets are welded together while in the drum shape and the body is then stretched into a bilge shape, the welded seam is invariably broken, and such method has been found to be impractical.

Efforts have been made to form a bilge shaped metallic body by rolling a sheet of metal while hot around a metallic former but such efforts have proven to be impractical because of the fact that the metal used in making a barrel is so thin that it is impossible to keep the metal hot while rolling it into a bilge formation, particularly whereas in such cases it is necessary to compress the lateral margins of the sheet into the reduced diameter required to form the ends of a bilge-shaped body. Other methods have been made to roll a sheet of metal while cold into a bilge formation around a form or between rolls, but such efforts have not been found to be practical or operative.

My invention, therefore, has for its primary object to provide a method for making bilge shaped bodies with a butt-welded seam. That object I accomplish by the means illustrated in the accompanying drawings, in which drawings like characters of reference indicate corresponding parts throughout the several views, and in which—

Figure 1 is a plan of a sheet metal blank having corrugations formed therein, said corrugations being deepest at the middle of the corrugations and diminishing in depth from the middle toward the opposite ends of said corrugations; Fig. 2 is a central longitudinal section taken on the line 2—2 of Fig. 1; Fig. 3 is a transverse section taken on the line 3—3 of Fig. 1; and Fig. 4 is a side elevation of the blank shown in Fig. 1, bent into cylindrical form, and the corrugations removed, the ends of the sheet forming the body being butt welded together.

As illustrated in the drawings, a sheet of metal 1 is stretched into corrugations 2, the corrugations being greatest in depth along the central longitudinal line of the sheet, or that part of the sheet designed to form the middle of the body, and diminishing in depth from the middle toward the opposite ends of the said corrugations, as illustrated and described in Letters Patent issued to me October 27, 1908, No. 901,963. The corrugations are preferably made to terminate at or merge into the uncorrugated portion of the blank. After the metal has been stretched into corrugations, the corrugations are pressed out and the sheet bent into circular form, as shown in Fig. 4. After the body has been stretched and bent into the form shown in Fig. 4, the edges of the ends 3—3 of the sheet may be readily brought into juxtaposition and butt welded together, making an absolutely tight joint 4, the smooth surface at the joint thereby dispensing with the cost of perforating, riveting and brazing, and making a joint in every way superior to the overlapping riveted and brazed joint heretofore used.

While I prefer to stretch the blank into bilge shape in the manner I have herein shown and described, I do not desire to be limited to such construction and mode of operation so far as making a butt welded joint is concerned, and other means for stretching the blank into bilge formation before butt welding the same may be adopted without departing from my invention.

Having thus described my invention, what I claim as new and desire to secure by Letters Patent—

The method of making bilge bodies of sheet metal with a butt welded seam, consisting in first stretching a sheet metal blank into corrugations diminishing in depth from the middle toward the opposite end of said corrugations, pressing out said corrugations, bending the body into cylindrical form, and butt welding together the two adjacent lateral margins of said blank.

In witness whereof I have signed my name to this specification in the presence of two subscribing witnesses.

ROBERT W. HARDIE.

Witnesses:
JOHN K. BRACHVOGEL,
ORSONS MUNN.